A. BLONDEL & G. DOBKEVITCH.
ELECTRIC ARC LAMP.
APPLICATION FILED DEC. 16, 1905. RENEWED DEC. 19, 1911.
1,019,731.
Patented Mar. 5, 1912.
3 SHEETS—SHEET 1.
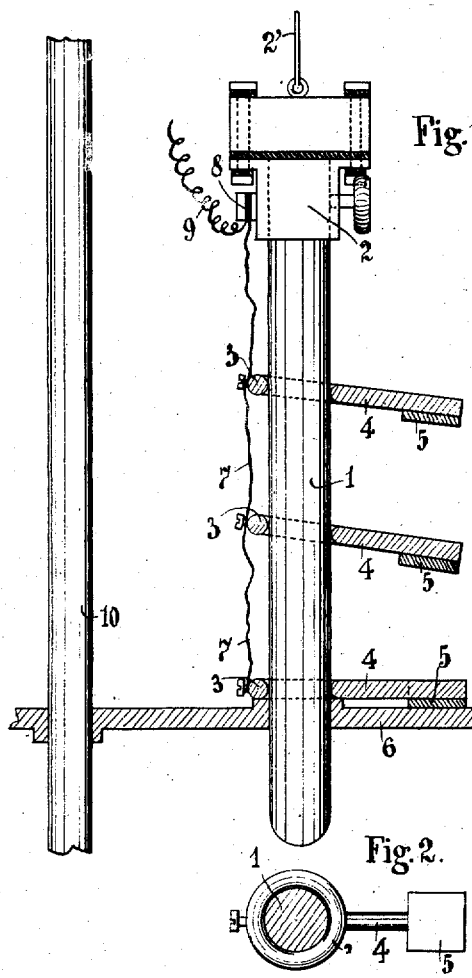
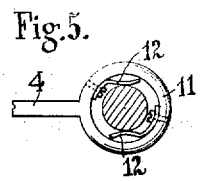
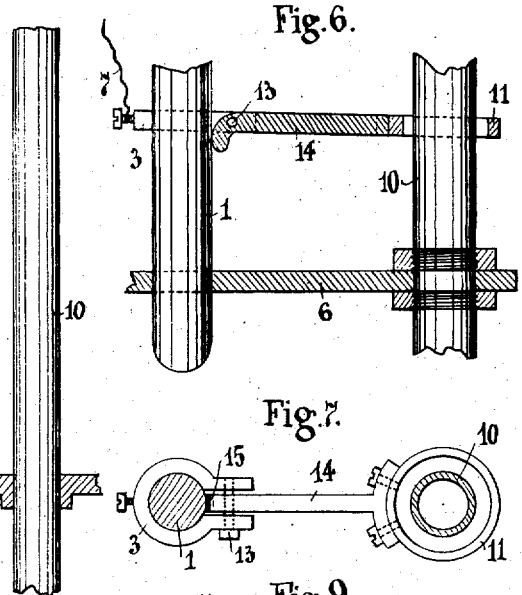
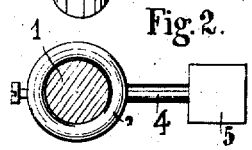
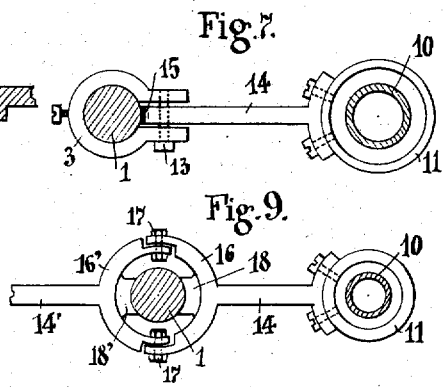
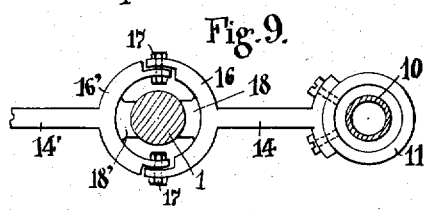
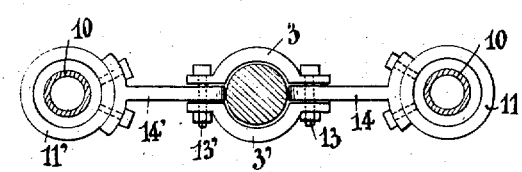
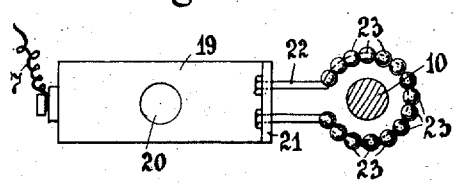
WITNESSES:
George G. Schoenlank
W. H. Berrigan
INVENTORS,
ANDRÉ BLONDEL & GAËTAN DOBKEVITCH
BY H. van Oldenneel
THEIR ATTORNEY.

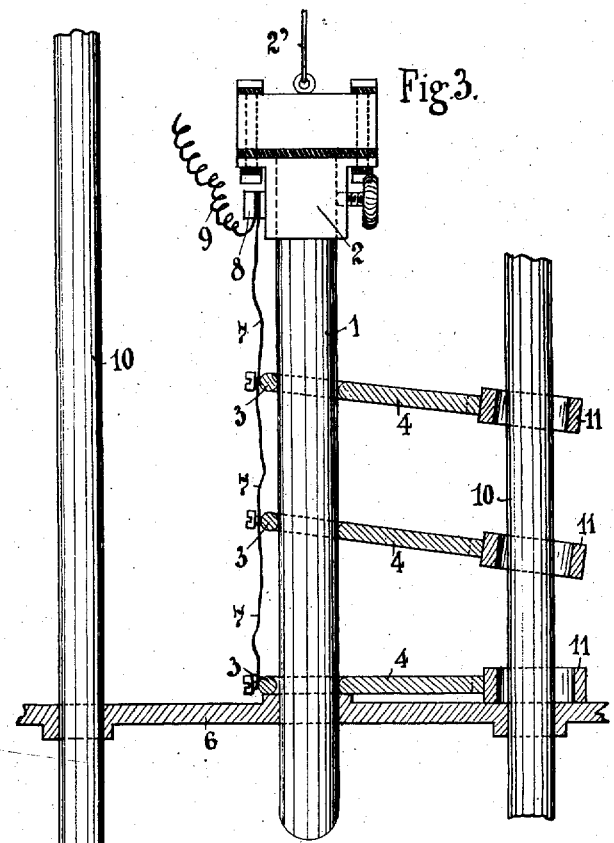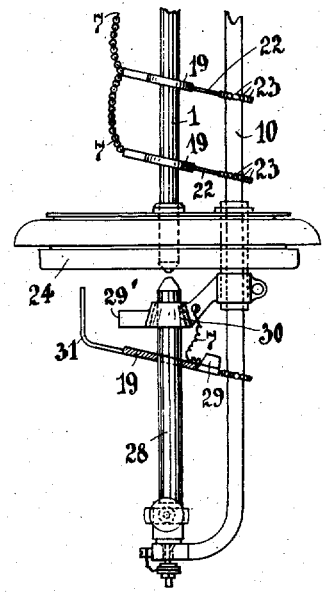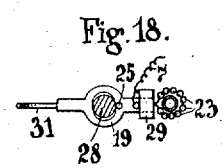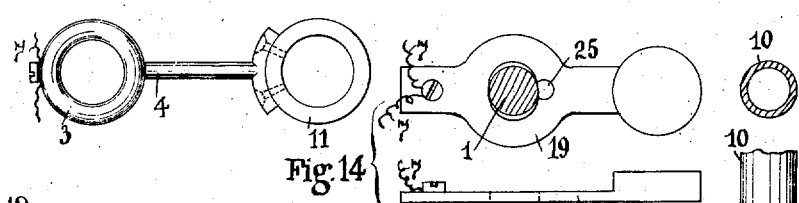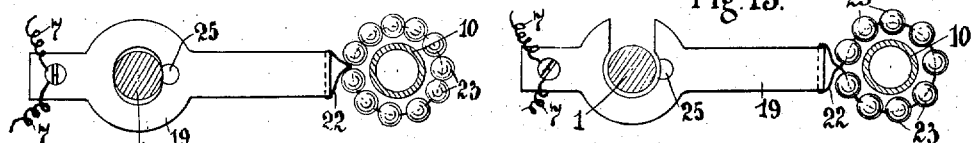

A. BLONDEL & G. DOBKEVITCH.
ELECTRIC ARC LAMP.
APPLICATION FILED DEC. 16, 1905. RENEWED DEC. 19, 1911.

1,019,731.

Patented Mar. 5, 1912.

3 SHEETS—SHEET 3.

WITNESSES:
George G. Schoenlank
H. H. Berrigan

INVENTORS,
ANDRÉ BLONDEL Y GAËTAN DOBKEVITCH,
BY Ivan Oldenneel
THEIR ATTORNEY.

UNITED STATES PATENT OFFICE.

ANDRÉ BLONDEL AND GAËTAN DOBKEVITCH, OF PARIS, FRANCE, ASSIGNORS, BY MESNE ASSIGNMENTS, TO GENERAL ELECTRIC COMPANY, A CORPORATION OF NEW YORK.

ELECTRIC-ARC LAMP.

1,019,731.  Specification of Letters Patent.  Patented Mar. 5, 1912.

Original application filed February 1, 1905, Serial No. 243,774. Divided and this application filed December 16, 1905, Serial No. 291,982. Renewed December 19, 1911. Serial No. 666,844.

*To all whom it may concern:*

Be it known that we, ANDRÉ BLONDEL, citizen of the Republic of France, and GAËTAN DOBKEVITCH, a subject of the Russian Emperor, both residing at Paris, France, have invented new and useful Improvements in Electric-Arc Lamps; and we do hereby declare the following to be a full, clear, and exact description of the same, the present application being a division of our prior application, Serial No. 243,774, filed February 1, 1905.

Our present invention relates to electric arc-lamps, especially those using mineralized electrodes, the object being to provide means whereby the loss of voltage, caused by the use of mineralized electrodes of high resistance and comparatively great length, is completely avoided, so that arc-lamps of very low voltage (say 26 to 28 volts) may be obtained with a uniform operation.

In practice, we attain the object of our invention by the use of specially constructed conducting members, connected to the electric wire, and comprising rings which surround the carbons in such manner that said conducting members are lowered together with the carbons, which may freely pass through said rings of the conducting members at the end of the movement of said members.

In the accompanying drawings we have shown several forms of embodiment of our invention.

Figure 11:
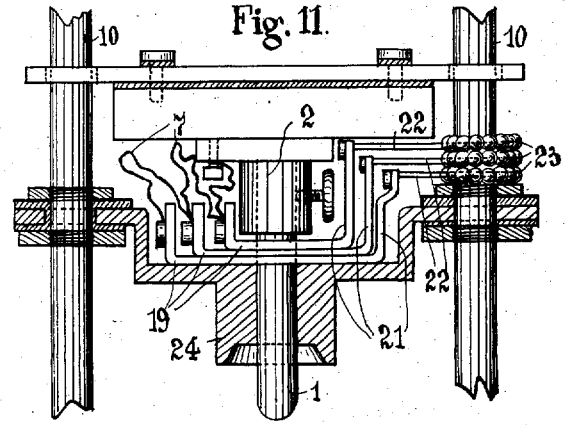
Figure 16:
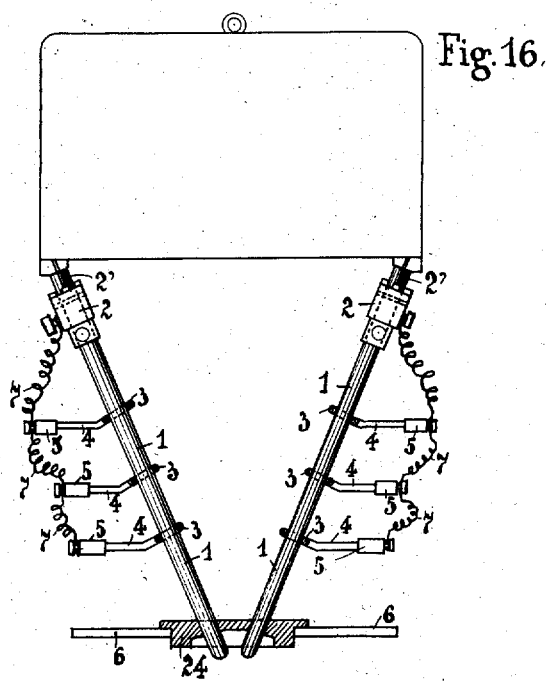

Figure 1 shows the upper carbon of a lamp provided with our improvements; Fig. 2 is the plan view of one of the conducting members surrounding and carried by said carbon; Fig. 3 is a vertical section showing certain parts in elevation of a modification of the structure shown in Fig. 1; Fig. 4 is a plan of one of the conducting members of Fig. 3; Fig. 5 is a modification of the structure shown in Fig. 4; Figs. 6 and 7 illustrate still another modification of our invention; Figs. 8 and 9 show a modification wherein guide rings on either side of the conducting ring 3 surround the guide rods; Fig. 10 shows a modification illustrating a convenient mode of insulating the connecting member from the guide rod; Fig. 11 shows the position of the carbon surrounding rings on the upper carbon of a lamp when said carbon is almost completely consumed. Figs. 12 to 15 show details of our invention; Fig. 16 shows our improvement applied to a lamp using converging electrodes; Fig. 17 shows our improvement applied to a lamp using upper and lower electrodes; Fig. 18 is a plan view of the lower conducting member shown in Fig. 17.

Like numerals refer to like parts throughout all the views.

Referring particularly to Figs. 1 and 2, 1 represents the upper carbon of a lamp secured to the carbon holder 2, the latter being attached to a chain, 2', or the like, in the well known way. Slipped over the carbon 1, are conducting members 4 comprising rings 3 the diameter of which is a little larger than the diameter of the carbon 1. To the end of the stem of each conducting member is attached a suitable weight, such as 5, whereby the ring is clamped on the carbon, as shown, until it comes into contact with an upper projection on a plate 6, arranged above the usual economizer of the lamp. Said conducting members are arranged at suitable intervals along the carbon 1, and the rings thereof are shown electrically connected to each other by means of a flexible wire or connection 7, the upper end of which is attached to a projection 8, carried by the carbon-holder 2, and to which the electric current is brought through a wire 9. It will be understood that by this arrangement of the conducting members, the electric current is brought directly to the lower end of the carbon instead of being caused to pass through the entire carbon as in ordinary lamps. The carbon 1 being lowered according to the consumption thereof, the weighted ends 5 are successively brought upon the plate 6 and piled upon one another, and the rings 3 are disengaged from the carbon (see also Fig. 10), so that the latter may freely pass through the rings. When the carbon is again temporarily raised, the uppermost conducting member is carried away with it, as will be easily understood. The conducting members 3 may furthermore be guided along the usual guide-rods 10 of the lamp, and for this purpose the weight 5 may be in the form of or be replaced by a suitable ring 11 (see Fig. 3); said rings 11 freely slide upon one of said guide-rods 10 as shown. The electric current may also be brought to the guide-rod 10. In this case, the latter is suitably insulated from the frame of the lamp and the inner sides of the guide-rings 11 are provided with contact-springs 12 (Fig. 5) pressing constantly against said guide-rod. When the guide-rods 10 are not insulated from the frame of the lamp, the rings 11 are preferably provided with insulating material, such as porcelain, or made entirely of insulating material.

In another embodiment, the conducting members may comprise yokes or open rings (see Figs. 6 and 7), the ends of which are provided with a pin 13, acting as a pivot for the end of an arm 14, the opposite end of which carries the insulated guide-ring 11, surrounding the guide-rod 10. The contact-ring 3 is slidably clamped in position on the carbon 1 by the pressure of the downwardly projecting extension 15 of said arm 14. Fig. 8 shows a similar arrangement, wherein the contact-ring is composed of two sections, 3 and 3', connected by pins 13, 13', carrying the arms 14, 14' provided with guide rings 11, 11' each of which embraces one of the guide-rods 10 of the lamp. This construction may fairly be considered a duplication or modification of the structure of Fig. 6.

In the modification or form of conducting member shown in Fig. 9, arms 14, 14' are provided with ring-sections 16, 16', hinged together on opposite sides by means of pins 17, and provided with gripping contact-pieces 18, 18', pressing upon the carbon 1.

In practice, it will of course be more convenient to have the guide-rods 10 not insulated from the frame of the lamp, and instead of using guide-rings made of porcelain or other insulating material we may use the device shown in Fig. 10. In this modification, the direct contact part is formed of a rectangular plate 19, provided with a central hole 20 to fit around the carbon and a vertically projecting branch or plate 21, to which are attached the ends of a rod or wire 22, curved to fit around the guide-rod 10 and provided with a plurality of insulating balls, such as beads 23 strung upon the rod or wire, whereby the contact-plate 19, carried by the carbon 1 is insulated from the rod 10 and the frame of the lamp, the electric current being brought to said contact-plate through the wire 7 as already described in connection with Fig. 1.

Fig. 11 shows the shape and nesting of successive plates 19 carried by the carbon 1, and bringing the current to the neighborhood of the free end thereof; as shown the plates are successively deposited upon the economizer 24 of the lamp, when the carbon 1 is lowered according to the consumption.

Figure 15:
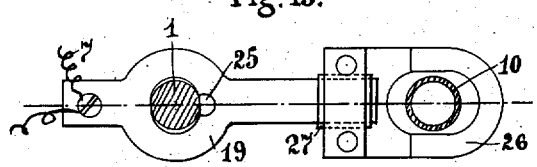

The contact-plates 19 shown in Figs. 12, 13, 14 and 15, are provided with silver contacts 25 through which the current is brought to the carbon 1. In Fig. 15 the plate is insulated from the guide-loop 26 by means of a sheet of mica 27, the guide-loop being made of metal.

Fig. 16 shows an arc-lamp embodying inclined electrodes 1, each of which is provided with a plurality of contact members having rings 3, whereby the electric current is brought to the neighborhood of the free ends of said electrodes 1.

In another arrangement of lamp shown in Fig. 17 the upper carbon 1 is provided with a plurality of contact members such as contact-plates 19, guided along the guide-rod 10 of the lamp and electrically connected to each other by means of wires 7, also provided with suitable insulating balls or the like. The lower carbon (28 in this instance) is also provided with a conducting member, such as contact plate 19 (Fig. 17) provided with a suitable weight 29, whereby said plate is clamped on the carbon 28, while it is guided along the lower guide-rod of the lamp. The carbon 28 being raised, the end of the plate 19 will engage the lateral extension 29' of the lower carbon-guide 30, whereby said plate 19 will be disengaged automatically and drop again along the carbon so far as it is allowed by the length of the wire 7. The contact plate 19 (just mentioned) may also be provided with an extension 31, adapted to engage the economizer 24 of the lamp when the carbon 28 is raised to a given extent, in order to disengage said plate automatically from the carbon 28.

It is evident that other changes and modifications in the construction of said contact means may be resorted to, without departing from the scope or sacrificing any of the advantages of the invention.

This application is a division of an application, Serial No. 243774, filed by us on February 1, 1905, for Letters Patent of the United States.

Having fully described our invention, what we claim and desire to secure by Letters Patent is:—

1. In an arc lamp, the combination, with a carbon, of a plurality of current-conducting devices arranged along the carbon and having a loose clamping engagement with said carbon, a protecting plate arranged in close proximity to the free end of said carbon for disengaging the current-collecting devices from the carbon when brought into engagement with said protecting plate, and means for electrically connecting said current-conducting devices to each other and to a main conductor.

2. In an arc lamp, the combination, with a carbon, of a plurality of current-conducting devices each comprising a ring surrounding the carbon and carrying a weight, a horizontal protecting plate arranged in close proximity to the free end of said carbon for disengaging said current-conducting devices from the carbon when brought into engagement with said separating plate, and means for electrically connecting said current-conducting devices to each other and to a main conductor.

3. In an arc-lamp, a lamp frame having a vertical rod, in combination with a carbon, a plurality of current-conducting rings arranged along and surrounding the carbon, a laterally projecting stem on each ring, a weight at the free end of said stem, a horizontal protecting plate arranged in close proximity to the free end of said carbon, for automatically disengaging the rings from the carbon when the weights aforesaid are brought against the protecting plate, means for electrically connecting said rings to each other, and means for guiding said rings along the aforesaid vertical rod of the lamp frame, substantially as set forth.

4. In an arc lamp, the combination, with a carbon, of a plurality of current-conducting rings arranged along and surrounding the carbon, a laterally projecting stem on each ring, a guiding loop on the free end of each stem and insulated from the ring, a horizontal protecting plate arranged in close proximity to the free end of said carbon for automatically disengaging the rings from the carbon when brought against the protecting plate, a rod constituting part of the frame of the lamp and loosely engaging the guiding loops, and means for electrically connecting said rings to each other, substantially as set forth.

5. In an arc lamp, the combination, with a carbon, of a plurality of current-conducting rings arranged along and surrounding the carbon, a stem pivoted to and laterally projecting from each ring, a movable dog on each stem and engaging the carbon, a guiding loop or ring on the opposite end of the stem, a horizontal protecting plate arranged in close proximity to the free end of said carbon for automatically disengaging the rings from the carbon when brought against the protecting plate, a rod constituting part of the frame of the lamp and loosely engaging the guiding loops, and means for electrically connecting said rings to each other, substantially as set forth.

In testimony whereof, we have signed our names to this specification in the presence of two subscribing witnesses.

ANDRÉ BLONDEL.
GAËTAN DOBKEVITCH.

Witnesses as to A. B.:
Louis Gastiman,
Frank H. Mason.
Witnesses as to G. D.:
Frank H. Mason,
Frederic W. Cauldwell.